United States Patent
Wang et al.

(10) Patent No.: US 12,322,787 B1
(45) Date of Patent: Jun. 3, 2025

(54) PREPARATION METHOD FOR COPPER-ALUMINUM COMPOSITE POLE PLATE

(71) Applicants: TRIO METAL (GZ) CO., LTD, Guangzhou (CN); GUANGZHOU ZHONGSHAN NEW ENERGY TECHNOLOGY CO., LTD., Guangzhou (CN)

(72) Inventors: Fenglin Wang, Guangzhou (CN); Weifu Yang, Guangzhou (CN); Yufan Huang, Guangzhou (CN); Jiangang Lv, Guangzhou (CN); Xuemin Zhai, Guangzhou (CN); Haiquan Feng, Guangzhou (CN)

(73) Assignee: TRIO METAL (GZ) CO., LTD, Guangdong (CN)

( * ) Notice: Subject to any disclaimer, the term of this patent is extended or adjusted under 35 U.S.C. 154(b) by 0 days.

(21) Appl. No.: 19/009,981

(22) Filed: Jan. 4, 2025

Related U.S. Application Data

(63) Continuation of application No. PCT/CN2024/137827, filed on Dec. 9, 2024.

(30) Foreign Application Priority Data

Apr. 12, 2024 (CN) .......................... 202410438971.8

(51) Int. Cl.
| | |
|---|---|
| *H01M 4/04* | (2006.01) |
| *H01M 4/36* | (2006.01) |
| *H01M 4/46* | (2006.01) |
| *H01M 4/02* | (2006.01) |

(52) U.S. Cl.
CPC ......... *H01M 4/362* (2013.01); *H01M 4/0435* (2013.01); *H01M 4/0485* (2013.01); *H01M 4/463* (2013.01); *H01M 2004/021* (2013.01)

(58) Field of Classification Search
CPC .. H01M 4/362; H01M 4/0435; H01M 4/0485; H01M 4/463
See application file for complete search history.

(56) References Cited

FOREIGN PATENT DOCUMENTS

| | | | | |
|---|---|---|---|---|
| CN | 107658417 A | * | 2/2018 | |
| CN | 109616607 A | * | 4/2019 | ............ H01M 10/04 |

* cited by examiner

*Primary Examiner* — Jason L Vaughan
*Assistant Examiner* — Amanda Kreiling
(74) *Attorney, Agent, or Firm* — Valet Patent Service Limited

(57) ABSTRACT

The present application belongs to the field of new energy technology. The present application provides a preparation method for copper-aluminum composite pole plate, which comprises: heating the aluminum ingot to 700-800° C. for smelting, and allowing the aluminum ingot liquid at 700-800° C. to stand still for 0-30 minutes to obtain an aluminum solution, roughening and cleaning the copper strip to complete the surface pretreatment of the copper strip, continuously casting aluminum strips on aluminum solution after being left to stand, and forming pole aluminum bosses through forming rollers, increasing the copper-aluminum bonding strength, and side discharging aluminum waste, molding at room temperature for the forming of fine features of the boss and the shaping of large bosses during rolling, cutting the pole and determining whether the battery pole product meets the standard, thereby improving the preparation process and equipment for the copper-aluminum composite material for the pole.

10 Claims, 4 Drawing Sheets

```
┌─────────────────────────────────────────────────────────┐
│ heating aluminum ingot to 700-800°C for smelting, and   │
│ allowing the 700-800°C-aluminum ingot liquid to stand still │
│ for 0-30 minutes to obtain an aluminum solution         │
└─────────────────────────────────────────────────────────┘
                            │
                            ▼
┌─────────────────────────────────────────────────────────┐
│ roughening and cleaning a copper strip to complete a surface │
│ pretreatment of the copper strip                        │
└─────────────────────────────────────────────────────────┘
                            │
                            ▼
┌─────────────────────────────────────────────────────────┐
│ continuously casting the aluminum strip on the          │
│ aluminum solution after being left to stand             │
└─────────────────────────────────────────────────────────┘
                            │
                            ▼
┌─────────────────────────────────────────────────────────┐
│ forming pole aluminum bosses through forming roller,    │
│ increasing the copper-aluminum bonding strength, and    │
│ side discharging aluminum waste                         │
└─────────────────────────────────────────────────────────┘
                            │
                            ▼
┌─────────────────────────────────────────────────────────┐
│ molding at room temperature for the forming of fine     │
│ features of the boss and the shaping of large boss      │
└─────────────────────────────────────────────────────────┘
                            │
                            ▼
┌─────────────────────────────────────────────────────────┐
│ cutting the pole and determining whether the battery    │
│ pole product meets the standard                         │
└─────────────────────────────────────────────────────────┘
```

FIG. 1

PREPARATION METHOD FOR COPPER-ALUMINUM COMPOSITE POLE PLATE

TECHNICAL FIELD

The present application belongs to the field of new energy technology, specifically a preparation method for copper-aluminum composite pole plate.

BACKGROUND

Copper-aluminum composite pole plate is a composite material that combines the excellent properties of both copper and aluminum. Copper has good electrical conductivity, corrosion resistance, oxidation resistance, and high thermal capacity, while aluminum is characterized by its light weight and low density. Therefore, in the process of preparing copper-aluminum composite pole plate, the key technology lies in how to effectively combine copper and aluminum while maintaining their respective excellent properties.

A Chinese patent application with publication number CN109616607B discloses a forming method for copper-aluminum composite pole, which comprises separately blanking copper and aluminum rods to obtain copper and aluminum bars, respectively upsetting the copper and aluminum bars, and blanking to obtain copper and aluminum conductive sheets, respectively. The bottom of the copper conductive sheet is docked with the aluminum conductive sheet and welded into one piece to obtain a copper-aluminum composite pole, which is then cleaned and upset for material flow.

In the prior art, when only the copper and aluminum conductive sheets obtained by re-upsetting are upset for material flow, the flow is uniform along the copper and aluminum positioning holes, and the structure of the copper and aluminum conductive sheets is stable. There is no specific analysis of the copper and aluminum conductive sheets to determine the impact on the production of the copper-aluminum composite pole, nor is there an analysis of the performance of the obtained copper-aluminum composite pole to determine whether it meets the standard.

To this end, the present application provides a preparation method for copper-aluminum composite pole plate.

SUMMARY

To overcome the deficiencies in the prior art and solve at least one technical problem proposed in the background technology.

The technical solution adopted by the present application to solve its technical problem is: a preparation method for copper-aluminum composite pole plate, comprising the following steps:

In step 1, the 700-800° C.—aluminum ingot is allowed to stand still for 0-30 minutes to obtain an aluminum solution. How to evaluate the quality of the aluminum solution;

step 2: roughening and cleaning a copper strip to complete a surface pretreatment of the copper strip;

step 3: continuously casting the aluminum strip on the aluminum solution after being left to stand;

step 4: forming pole aluminum bosses through forming roller, increasing the copper-aluminum bonding strength, and side discharging aluminum waste;

step 5: molding at room temperature for the forming of fine features of the boss and the shaping of large boss;

step 6: cutting the pole and determining whether the battery pole product meets the standard;

wherein comparing a forming warm roller pole aluminum copper standard determination value Q with a preset forming warm roller pole aluminum copper standard determination threshold, wherein the comparison process is as follows:

if the forming warm roller pole aluminum copper standard determination value Q is greater than or equal to the preset forming warm roller pole aluminum copper standard determination threshold, then the forming warm roller pole aluminum copper meets the standard;

if the forming warm roller pole aluminum copper standard determination value Q is less than the preset forming warm roller pole aluminum copper standard determination threshold, then the forming warm roller pole aluminum copper does not meet the standard.

As a further technical solution of the present application: in step 1, obtaining the 700-800° C.—aluminum solution on the aluminum ingot liquid after standing still for 0-30 minutes, and evaluating the quality of the aluminum solution;

A1. testing the fluidity of the aluminum solution after standing still to obtain a representative flow value of the aluminum solution;

A2. testing the gas content in the aluminum solution after standing still to obtain a representative gas content value of the aluminum solution.

A3. performing processing based on the representative flow value E of the aluminum solution and the representative gas content value R of the aluminum solution to obtain the quality determination value of the aluminum solution, and evaluating the quality of the aluminum solution.

As a further technical solution of the present application: in A1, determining the fluidity of the aluminum solution by detecting the viscosity of the aluminum solution after standing still, with the specific process as follows:

A101. extracting a portion of the aluminum solution and dividing it into several groups of equal portions of the aluminum solution to obtain the representative viscosity values of several groups of equal portions of the aluminum solution;

A102. summing up representative viscosity values of several groups of equal portions of aluminum solution to obtain an average value, and using the average value as the solution viscosity determination value;

A103. processing based on extracting partial solution viscosity determination values and obtaining a representative flow value E of the aluminum solution through the formula: $E = M \times \alpha$, wherein M represents the solution viscosity determination value, and a represents the preset proportional coefficient.

As a further technical solution of the present application: in A2, determining the gas content of the aluminum solution by detecting a density deviation value of the aluminum solution after standing still, and the specific process is as follows:

A201. obtaining a density of the aluminum solution after standing still;

A202. subtracting a standard density of the aluminum solution from the density of the aluminum solution after standing still, and taking the difference as the density deviation value of the actual aluminum solution;

A203. calculating a ratio between the density deviation value of the actual aluminum solution and the standard density of the aluminum solution, using the ratio as the representative gas content value of the aluminum solution;

wherein obtaining t the representative gas content value R of the aluminum solution through the formula:

$$R = \frac{F-U}{F} \times \beta,$$

wherein F represents the standard density of the aluminum solution, U represents the density of the aluminum solution after standing still, and $\beta$ represents the preset proportional coefficient.

As a further technical solution of the present application: in A3, performing processing based on the representative flow value E of the aluminum solution and the representative gas content value R of the aluminum solution, and the specific process is as follows:

A301. based on the representative flow value E of the aluminum solution and the representative gas content value R, obtaining the quality determination value W of the aluminum solution through the formula:

$$W = \frac{E}{R} \times \epsilon,$$

wherein $\epsilon$ represents a preset proportional coefficient;

A302. based on the quality determination value W of the aluminum solution, comparing the quality determination value W of the aluminum solution d with a preset quality determination threshold of the aluminum solution, and the specific comparison process is as follows:

if the quality determination value W of the aluminum solution is greater than or equal to the preset quality determination threshold of the aluminum solution, the aluminum solution is determined to be of high quality;

if the quality determination value W of the aluminum solution is less than the preset quality determination threshold of the aluminum solution, the aluminum solution is determined to be of low quality.

As a further technical solution of the present application: in step 2, treating the copper strip after the roughening and cleaning to obtain a surface flatness value of the copper strip, and the specific process is as follows:

B1. detecting the surface of the copper strip after the roughening and cleaning to obtain flatness values at different positions on the surface of the copper strip;

B2. screening based on the flatness values at different positions on the surface of the copper strip to obtain the mode of the flatness values at different positions on the surface of the copper strip;

B3. based on the mode of the flatness values at different positions on the surface of the copper strip, subtracting the flatness values at different positions on the surface of the copper strip from the mode of the flatness values, and using the difference as a flatness deviation values at different positions on the surface of the copper strip;

B4. summing up the flatness deviation values s at different positions on the surface of the copper strip to obtain an average value, and using the average value as a flatness deviation coefficient at different positions on the surface of the copper strip;

B5. obtaining a representative flatness value K on the surface of the copper strip through the formula: K=T× ω, wherein T represents the mode of the flatness values at different positions on the surface of the copper strip, and ω represents the flatness deviation coefficient at different positions on the surface of the copper strip.

As a further technical solution of the present application: in step 3, detecting the flatness of the surface of the aluminum strip after continuous casting to obtain the representative flatness value on the surface of the aluminum strip after continuous casting, and the specific processing is as follows:

C1. detecting the surface of the aluminum strip after continuous casting to obtain the flatness values at different positions on the surface of the aluminum strip;

C2. screening based on the flatness values at different positions on the surface of the aluminum strip to obtain the flatness values at different positions on the surface of the aluminum strip;

C3. based on the flatness values at different positions on the surface of the aluminum strip, summing up the flatness values at different positions on the surface of the aluminum strip to obtain an average value, and using the average value as a representative flatness value L at different positions on the surface of the aluminum strip.

As a further technical solution of the present application: in step 4, performing stress bearing detection on the pole aluminum copper formed by warm rolling to obtain the representative stress bearing value;

D1. performing stress bearing detection on different positions of the pole aluminum copper formed by warm rolling to obtain stress bearing values at different positions;

D2. summing up the stress bearing values at different positions of the pole aluminum copper formed by warm rolling to obtain a squared difference, ands using the squared difference as the representative stress bearing value of the pole aluminum copper formed by warm rolling.

As a further technical solution of the present application: in step 6, performing processing based on the representative flatness value K on the surface of the copper strip, the representative flatness value L at different positions on the surface of the aluminum strip, and the representative stress bearing value of the pole aluminum copper formed by warm rolling, and the specific processing procedure is as follows:

S1. obtaining a representative resistance value of the pole aluminum copper formed by warm rolling based on the representative flatness value K on the surface of the copper strip and the representative flatness value L at different positions on the surface of the aluminum strip; specifically, obtaining the resistance representative value V of the pole aluminum copper formed by warm rolling by V=lg(K+L)×h, wherein h represents a preset proportional coefficient;

S2. performing processing based on the representative resistance value V and the representative stress bearing value of the pole aluminum copper formed by warm rolling to obtain a standard determination value of the pole aluminum copper formed by warm rolling.

As a further technical solution of the present application: in S2, obtaining the standard determination value Q of the pole aluminum copper of the forming temperature by formula:

$$Q = \frac{V}{P} \times \theta,$$

wherein P represents the representative stress bearing value of the pole aluminum copper formed by warm rolling, and θ represents the preset proportional coefficient, specifically, comparing the standard determination value Q of the pole aluminum copper formed by warm rolling with the preset standard determination threshold of the pole aluminum copper formed by warm rolling, and the comparison process is as follows:

if the standard determination value Q of the pole aluminum copper formed by warm rolling is greater than or equal to the preset standard determination threshold of the pole aluminum copper formed by warm rolling, then the pole aluminum copper formed by warm rolling meets the standard.

if the standard determination value Q of the pole aluminum copper formed by warm rolling is less than the preset standard determination threshold of the pole aluminum copper formed by warm rolling, then the pole aluminum copper formed by warm rolling does not meet the standard.

The beneficial effects of the present application are as follows:

1. The preparation method of copper-aluminum composite pole plate described in the present application involves heating aluminum ingots to 700-800° C. for smelting, allowing the aluminum ingot liquid at 700-800° C. to stand still for 0-30 minutes to obtain an aluminum solution, performing roughening and cleaning on the copper strip to complete the surface pretreatment of the copper strip, continuous casting the aluminum strip with the standing aluminum solution, forming the pole aluminum boss through the forming roller, increasing the copper-aluminum bonding strength, side discharging aluminum waste, performing molding at room temperature, shaping the small features of the boss formed by rolling and the large boss, cutting the pole, and determining whether the battery pole product meets the standard, thereby improving the preparation process and equipment for the copper-aluminum composite material used for the pole, ensuring that the formed battery pole is not of the traditional copper coil type.

2. The preparation method for copper-aluminum composite pole plate described in the present application involves obtaining the representative resistance value of the pole aluminum copper formed by warm rolling based on the representative flatness value K on the surface of the copper strip and the representative flatness value L at different positions on the surface of the aluminum strip. This is processed based on the representative resistance value V of the pole aluminum copper formed by warm rolling and the representative stress bearing value to obtain the standard determination value of the pole aluminum copper formed by warm rolling. The standard determination value Q of the pole aluminum copper formed by warm rolling is compared with the preset standard determination threshold of the pole aluminum copper formed by warm rolling. If the standard determination value Q of the pole aluminum copper formed by warm rolling is greater than or equal to the preset f standard determination threshold of the pole aluminum copper formed by warm rolling, then the pole aluminum copper formed by warm rolling meets the standard. Conversely, if it does not meet the standard, the pole aluminum copper formed by warm rolling is tested to distinguish the pole aluminum copper formed by warm rolling that meets the standard. The production plan is further optimized based on the pole aluminum copper formed by warm rolling that does not meet the standard.

BRIEF DESCRIPTION OF THE DRAWINGS

The following provides a further explanation of the application in conjunction with the drawings.

FIG. 1 is a flowchart of the first embodiment of the application;

DETAILED DESCRIPTION

To make the technical means, creative features, objectives, and effects achieved by the present application easy to understand, the following provides a further explanation of the application in conjunction with specific implementation methods.

Embodiment 1

Figure 2:
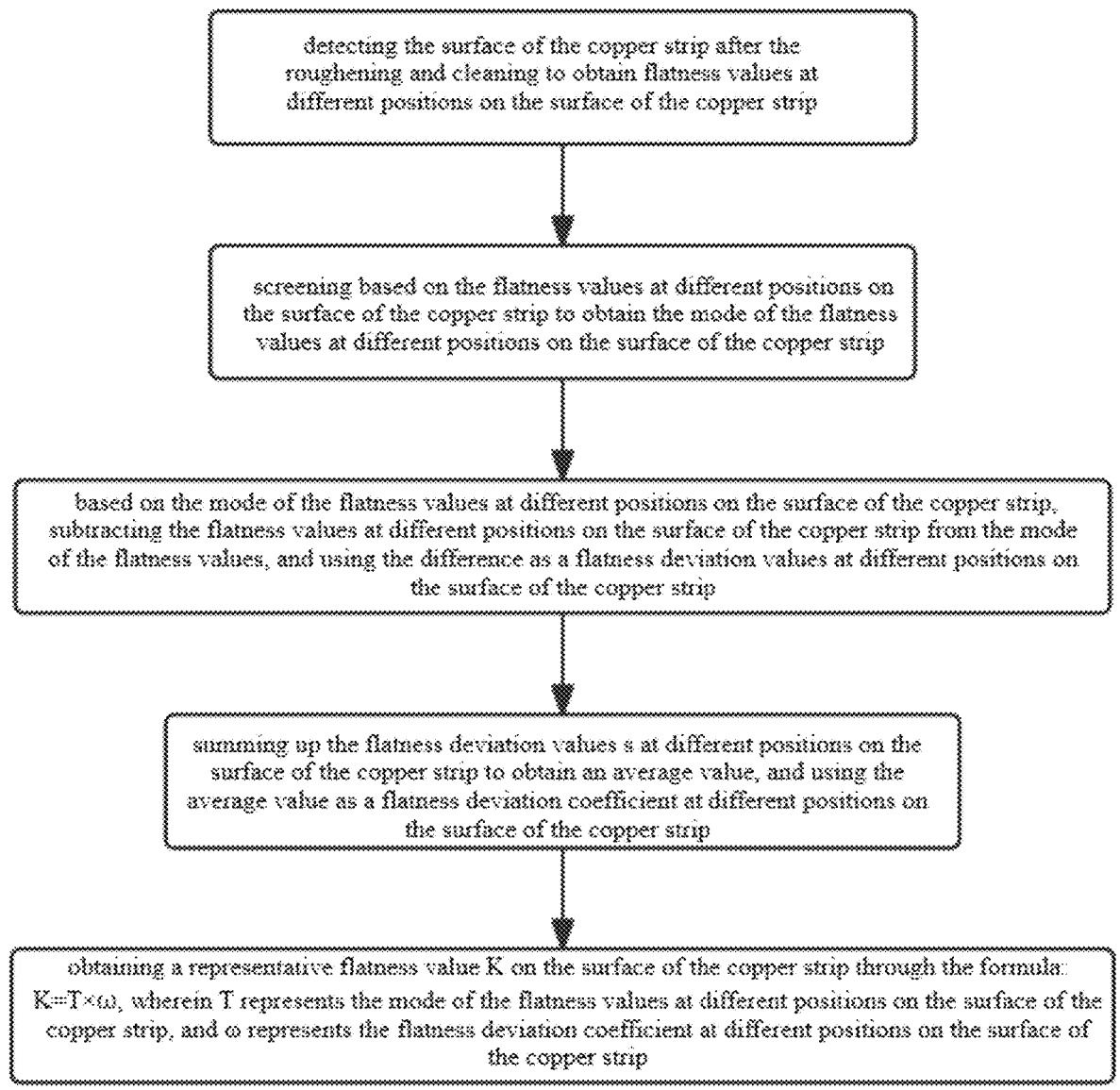
FIG. 2 is a flowchart of an embodiment of the application for detecting the flatness on the surface of the copper sheet.
Figure 3:
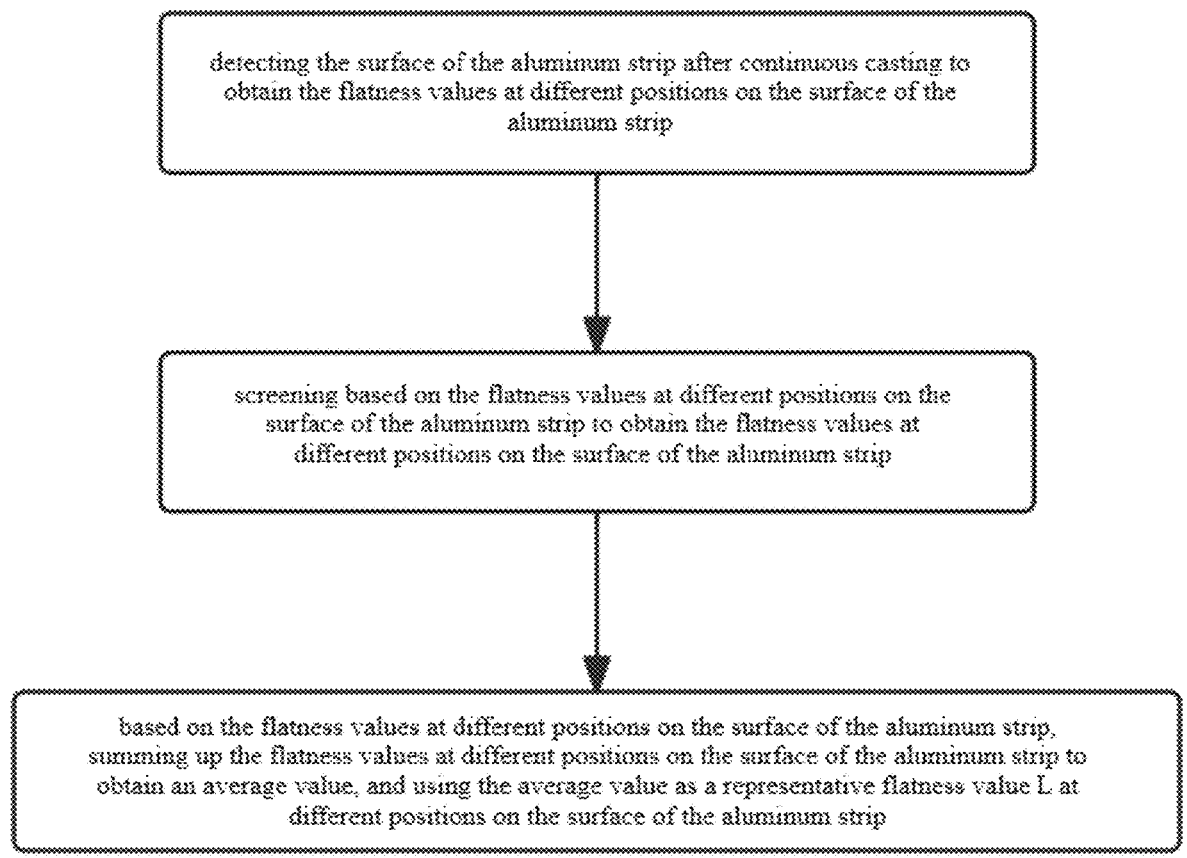
FIG. 3 is a flowchart of an embodiment of the application for detecting the flatness on the surface of the aluminum sheet.

As shown in FIGS. 1 to 3, the preparation method for copper-aluminum composite pole plate described in the embodiment of the present application comprises the following steps:

Step 1: heating the aluminum ingot to 700° C. for smelting, and allowing the 700° C.—aluminum ingot liquid to stand still for 5 minutes to obtain the aluminum solution;

In step 1, allowing the 700° C.—aluminum ingot liquid to stand still for 5 minutes to obtain the aluminum solution, and evaluating the quality of the aluminum solution.

A1. testing the fluidity of the aluminum solution after standing still to obtain a representative flow value of the aluminum solution, the specific process is as follows:

A101. extracting a portion of the aluminum solution and dividing it into several groups of equal portions of the aluminum solution to obtain the representative viscosity values of several groups of equal portions of the aluminum solution;

A102. summing up representative viscosity values of several groups of equal portions of aluminum solution to obtain an average value, and using the average value as the solution viscosity determination value;

A103, processing based on extracting partial solution viscosity determination values and obtaining a representative flow value E of the aluminum solution through the formula: $E = M \times \alpha$, wherein M represents the solution viscosity determination value, and a represents the preset proportional coefficient.

A2. testing the gas content in the aluminum solution after standing still to obtain a representative gas content value of the aluminum solution, the specific process is as follows:

A201. obtaining a density of the aluminum solution after standing still;

A202. subtracting a standard density of the aluminum solution from the density of the aluminum solution after standing still, and taking the difference as the density deviation value of the actual aluminum solution;

A203. calculating a ratio between the density deviation value of the actual aluminum solution and the standard density of the aluminum solution, using the ratio as the representative gas content value of the aluminum solution;

Specifically, obtaining t the representative gas content value R of the aluminum solution through the formula:

$$R = \frac{F-U}{F} \times \beta,$$

wherein F represents the standard density of the aluminum solution, U represents the density of the aluminum solution after standing still, and β represents the preset proportional coefficient;

A3. performing processing based on the representative flow value E of the aluminum solution and the representative gas content value R of the aluminum solution to obtain the quality determination value of the aluminum solution, and evaluating the quality of the aluminum solution, and the specific process is as follows:

A301. based on the representative flow value E of the aluminum solution and the representative gas content value R, obtaining the quality determination value W of the aluminum solution through the formula:

$$W = \frac{E}{R} \times \epsilon,$$

wherein c represents a preset proportional coefficient;

A302. based on the quality determination value W of the aluminum solution, comparing the quality determination value W of the aluminum solution d with a preset quality determination threshold of the aluminum solution, and the specific comparison process is as follows:

if the quality determination value W of the aluminum solution is greater than or equal to the preset quality determination threshold of the aluminum solution, the aluminum solution is determined to be of high quality;

if the quality determination value W of the aluminum solution is less than the preset quality determination threshold of the aluminum solution, the aluminum solution is determined to be of low quality;

Step 2: roughening and cleaning a copper strip to complete a surface pretreatment of the copper strip;

In step 2, treating the copper strip after the roughening and cleaning to obtain a surface flatness value of the copper strip, and the specific process is as follows:

B1. detecting the surface of the copper strip after the roughening and cleaning to obtain flatness values at different positions on the surface of the copper strip;

B2. screening based on the flatness values at different positions on the surface of the copper strip to obtain the mode of the flatness values at different positions on the surface of the copper strip;

B3. based on the mode of the flatness values at different positions on the surface of the copper strip, subtracting the flatness values at different positions on the surface of the copper strip from the mode of the flatness values, and using the difference as a flatness deviation values at different positions on the surface of the copper strip;

B4. summing up the flatness deviation values s at different positions on the surface of the copper strip to obtain an average value, and using the average value as a flatness deviation coefficient at different positions on the surface of the copper strip;

B5. obtaining a representative flatness value K on the surface of the copper strip through the formula: K=T× ω, wherein T represents the mode of the flatness values at different positions on the surface of the copper strip, and ω represents the flatness deviation coefficient at different positions on the surface of the copper strip.

Step 3: continuously casting the aluminum strip on the aluminum solution after being left to stand;

In step 3, detecting the flatness of the surface of the aluminum strip after continuous casting to obtain the representative flatness value on the surface of the aluminum strip after continuous casting, and the specific processing is as follows:

C1. detecting the surface of the aluminum strip after continuous casting to obtain the flatness values at different positions on the surface of the aluminum strip;

C2. screening based on the flatness values at different positions on the surface of the aluminum strip to obtain the flatness values at different positions on the surface of the aluminum strip;

C3. based on the flatness values at different positions on the surface of the aluminum strip, summing up the flatness values at different positions on the surface of the aluminum strip to obtain an average value, and using the average value as a representative flatness value L at different positions on the surface of the aluminum strip.

Specifically, the continuous casting speed is 200 mm/min, the casting width is 10 mm, and the casting thickness is 3 mm;

The technical solution of the embodiment of the present application: By detecting and screening the flatness values at different positions on the surface of the aluminum strip after continuous casting, the flatness values at different positions on the surface of the aluminum strip are obtained. The flatness values at different positions on the surface of the aluminum strip are summed and averaged, and the average value is used as the representative flatness value L at different positions on the surface of the aluminum strip. The representative flatness value L at different positions on the surface of the aluminum strip is used to indicate the flatness of the aluminum strip surface. By using the average value as the representative flatness value at different positions on the surface of the aluminum strip, abnormal fluctuations and errors in the flatness value data at different positions can be avoided, and it will not have a significant impact on the flatness data of the aluminum strip surface;

Step 4: forming pole aluminum bosses through forming roller, increasing the copper-aluminum bonding strength, and side discharging aluminum waste;

Specifically, rolling comprises cold rolling or warm rolling, with a typical warm rolling temperature of 300° C. At the same time, warm rolling can reduce the deformation of copper.

Figure 4:
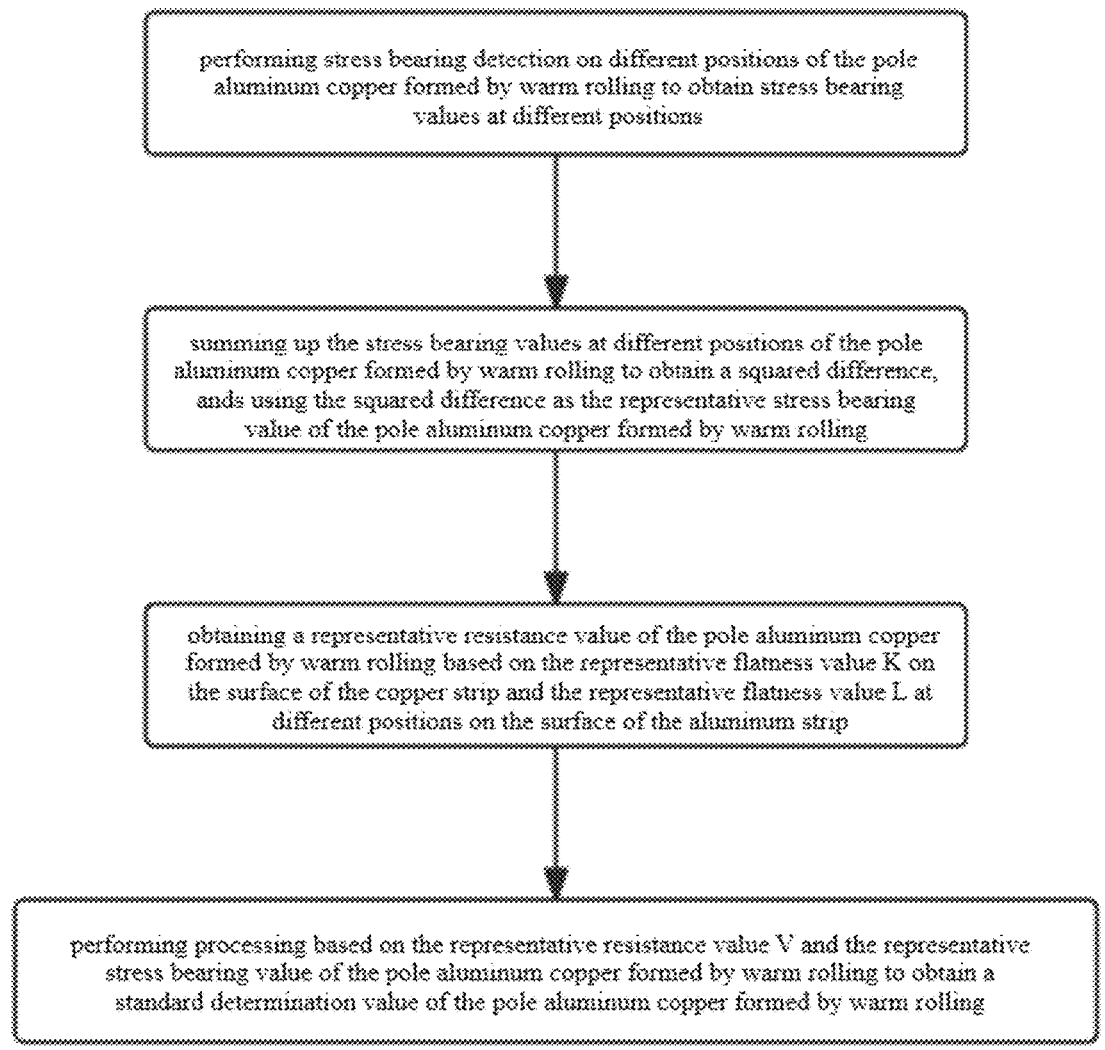
FIG. 4 is a flowchart for determining whether the battery pole product meets the standard in the present application.
Figure 5:
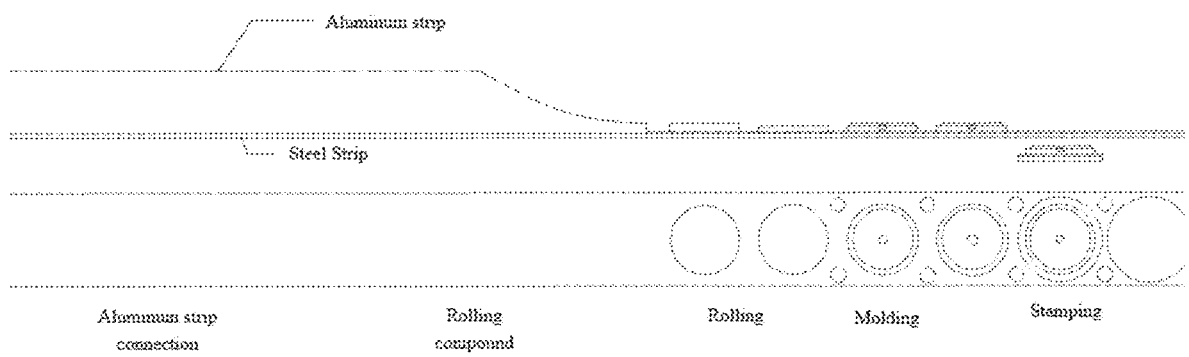
FIG. 5 is a flowchart of the preparation process of a copper-aluminum composite pole plate in the present application.

As described in FIG. 4, in step 4, performing stress bearing detection on the pole aluminum copper formed by warm rolling to obtain the representative stress bearing value.

D1. performing stress bearing detection on different positions of the pole aluminum copper formed by warm rolling to obtain stress bearing values at different positions;

D2. summing up the stress bearing values at different positions of the pole aluminum copper formed by warm rolling to obtain a squared difference, ands using the squared difference as the representative stress bearing value of the pole aluminum copper formed by warm rolling.

Step 5: molding at room temperature for the forming of fine features of the boss and the shaping of large boss.

Step 6: cutting the pole and determining whether the battery pole product meets the standard.

In step 6, performing processing based on the representative flatness value K on the surface of the copper strip, the representative flatness value L at different positions on the surface of the aluminum strip, and the representative stress bearing value of the pole aluminum copper formed by warm rolling, and the specific processing procedure is as follows:

S1. obtaining a representative resistance value of the pole aluminum copper formed by warm rolling based on the representative flatness value K on the surface of the copper strip and the representative flatness value L at different positions on the surface of the aluminum strip; specifically, obtaining the resistance representative value V of the pole aluminum copper formed by warm rolling by V=lg(K+L)×h, wherein h represents a preset proportional coefficient;

S2. performing processing based on the representative resistance value V and the representative stress bearing value of the pole aluminum copper formed by warm rolling to obtain a standard determination value of the pole aluminum copper formed by warm rolling.

In S2, obtaining the standard determination value Q of the pole aluminum copper of the forming temperature by formula:

$$Q = \frac{V}{P} \times \theta,$$

wherein P represents the representative stress bearing value of the pole aluminum copper formed by warm rolling, and θ represents the preset proportional coefficient;

Specifically, comparing the standard determination value Q of the pole aluminum copper formed by warm rolling with the preset standard determination threshold of the pole aluminum copper formed by warm rolling, and the comparison process is as follows:

if the standard determination value Q of the pole aluminum copper formed by warm rolling is greater than or equal to the preset standard determination threshold of the pole aluminum copper formed by warm rolling, then the pole aluminum copper formed by warm rolling meets the standard, if the standard determination value Q of the pole aluminum copper formed by warm rolling is less than the preset standard determination threshold of the pole aluminum copper formed by warm rolling, then the pole aluminum copper formed by warm rolling does not meet the standard.

Embodiment 2

The difference from Embodiment 1 is:

In Step 1, the 800° C.—aluminum ingot liquid is allowed to stand still for 30 minutes to obtain the aluminum solution, and the quality of the aluminum solution is evaluated;

Specifically, the continuous casting speed is 1200 mm/min, the casting width is 100 mm, and the casting thickness is 12 mm.

The above shows and describes the basic principles, main features, and advantages of the present application. It should be understood by those skilled in the art that the present application is not limited to the above embodiments. The embodiments and descriptions provided are merely illustrative of the principles of the application. Various changes and improvements can be made without departing from the spirit and scope of the application, and these changes and improvements fall within the scope of the claimed application. The protection scope of the present application is defined by the appended claims and their equivalents.

What is claimed is:

1. A preparation method for copper-aluminum composite pole plate, characterized in that comprising the following steps:

step 1: heating aluminum ingot to 700-800° C. for smelting, and allowing 700-800° C.—aluminum ingot liquid to stand still for 0-30 minutes to obtain an aluminum solution;

step 2: roughening and cleaning a copper strip to complete a surface pretreatment of the copper strip;

step 3: continuously casting the aluminum strip on the aluminum solution after being left to stand;

step 4: forming pole aluminum bosses through forming roller, increasing the copper-aluminum bonding strength, and side discharging aluminum waste; forming warm roller pole aluminum copper;

step 5: molding at room temperature for the forming of fine features of the boss and the shaping of large boss;

step 6: cutting the pole, forming a battery pole product, and determining whether the battery pole product meets the standard;

wherein comparing a forming warm roller pole aluminum copper standard determination value Q with a preset forming warm roller pole aluminum copper standard determination threshold, wherein the comparison process is as follows:

if the forming warm roller pole aluminum copper standard determination value Q is greater than or equal to the preset forming warm roller pole aluminum copper standard determination threshold, then the forming warm roller pole aluminum copper meets the standard;

if the forming warm roller pole aluminum copper standard determination value Q is less than the preset forming warm roller pole aluminum copper standard determination threshold, then the forming warm roller pole aluminum copper does not meet the standard.

2. The preparation method for copper-aluminum composite pole plate according to claim 1, characterized in that in step 1, obtaining the aluminum solution on the 700-800° C.—aluminum ingot liquid after standing still for 0-30 minutes, and evaluating the quality of the aluminum solution;

A1. testing the fluidity of the aluminum solution after standing still to obtain a representative flow value of the aluminum solution;

A2. testing the gas content in the aluminum solution after standing still to obtain a representative gas content value of the aluminum solution;

A3. performing processing based on the representative flow value E of the aluminum solution and the representative gas content value R of the aluminum solution to obtain the quality determination value of the aluminum solution, and evaluating the quality of the aluminum solution.

3. The preparation method for copper-aluminum composite pole plate according to claim 2, characterized in that in A1, determining the fluidity of the aluminum solution by detecting the viscosity of the aluminum solution after standing still, with the specific process as follows:

A101. extracting a portion of the aluminum solution and dividing it into several groups of equal portions of the aluminum solution to obtain the representative viscosity values of several groups of equal portions of the aluminum solution;

A102. summing up representative viscosity values of several groups of equal portions of aluminum solution to obtain an average value, and using the average value as the solution viscosity determination value;

A103. processing based on extracting partial solution viscosity determination values and obtaining a representative flow value E of the aluminum solution through the formula: E=M×α, wherein M represents the solution viscosity determination value, and a represents the preset proportional coefficient.

4. The preparation method for copper-aluminum composite pole plate according to claim 2, characterized in that in A2, determining the gas content of the aluminum solution by detecting a density deviation value of the aluminum solution after standing still, and the specific process is as follows:

A201. obtaining a density of the aluminum solution after standing still;

A202. subtracting a standard density of the aluminum solution from the density of the aluminum solution after standing still, and taking the difference as the density deviation value of the actual aluminum solution;

A203. calculating a ratio between the density deviation value of the actual aluminum solution and the standard density of the aluminum solution, using the ratio as the representative gas content value of the aluminum solution;

wherein obtaining t the representative gas content value R of the aluminum solution through the formula:

$$R = \frac{F - U}{F} \times \beta,$$

wherein F represents the standard density of the aluminum solution, U represents the density of the aluminum solution after standing still, and β represents the preset proportional coefficient.

5. The preparation method for copper-aluminum composite pole plate according to claim 2, characterized in that in A3, performing processing based on the representative flow value E of the aluminum solution and the representative gas content value R of the aluminum solution, and the specific process is as follows:

A301. based on the representative flow value E of the aluminum solution and the representative gas content value R, obtaining the quality determination value W of the aluminum solution through the formula:

$$W = \frac{E}{R} \times \epsilon,$$

wherein ϵ represents a preset proportional coefficient;

A302. based on the quality determination value W of the aluminum solution, comparing the quality determination value W of the aluminum solution d with a preset quality determination threshold of the aluminum solution, and the specific comparison process is as follows:

if the quality determination value W of the aluminum solution is greater than or equal to the preset quality determination threshold of the aluminum solution, the aluminum solution is determined to be of high quality;

if the quality determination value W of the aluminum solution is less than the preset quality determination threshold of the aluminum solution, the aluminum solution is determined to be of low quality.

6. The preparation method for copper-aluminum composite pole plate according to claim 1, characterized in that in step 2, treating the copper strip after the roughening and cleaning to obtain a surface flatness value of the copper strip, and the specific process is as follows:

B1. detecting the surface of the copper strip after the roughening and cleaning to obtain flatness values at different positions on the surface of the copper strip;

B2. screening based on the flatness values at different positions on the surface of the copper strip to obtain the mode of the flatness values at different positions on the surface of the copper strip;

B3. based on the mode of the flatness values at different positions on the surface of the copper strip, subtracting the flatness values at different positions on the surface of the copper strip from the mode of the flatness values, and using the difference as a flatness deviation values at different positions on the surface of the copper strip;

B4. summing up the flatness deviation values s at different positions on the surface of the copper strip to obtain an average value, and using the average value as a flatness deviation coefficient at different positions on the surface of the copper strip;

B5. obtaining a representative flatness value K on the surface of the copper strip through the formula: K=T×ω, wherein T represents the mode of the flatness values at different positions on the surface of the copper strip, and ω represents the flatness deviation coefficient at different positions on the surface of the copper strip.

7. The preparation method for copper-aluminum composite pole plate according to claim 1, characterized in that in step 3, detecting the flatness of the surface of the aluminum strip after continuous casting to obtain the representative flatness value on the surface of the aluminum strip after continuous casting, and the specific processing is as follows:

C1. detecting the surface of the aluminum strip after continuous casting to obtain the flatness values at different positions on the surface of the aluminum strip;

C2. screening based on the flatness values at different positions on the surface of the aluminum strip to obtain the flatness values at different positions on the surface of the aluminum strip;

C3. based on the flatness values at different positions on the surface of the aluminum strip, summing up the flatness values at different positions on the surface of the aluminum strip to obtain an average value, and using the average value as a representative flatness value L at different positions on the surface of the aluminum strip.

8. The preparation method for copper-aluminum composite pole plate according to claim 1, characterized in that in step 4, performing stress bearing detection on the pole aluminum copper formed by warm rolling to obtain the representative stress bearing value;
D1. performing stress bearing detection on different positions of the pole aluminum copper formed by warm rolling to obtain stress bearing values at different positions;
D2. summing up the stress bearing values at different positions of the pole aluminum copper formed by warm rolling to obtain a squared difference, ands using the squared difference as the representative stress bearing value of the pole aluminum copper formed by warm rolling.

9. The preparation method for copper-aluminum composite pole plate according to claim 1, characterized in that in step 6, performing processing based on the representative flatness value K on the surface of the copper strip, the representative flatness value L at different positions on the surface of the aluminum strip, and the representative stress bearing value of the pole aluminum copper formed by warm rolling, and the specific processing procedure is as follows:
S1. obtaining a representative resistance value of the pole aluminum copper formed by warm rolling based on the representative flatness value K on the surface of the copper strip and the representative flatness value L at different positions on the surface of the aluminum strip;
specifically, obtaining the resistance representative value V of the pole aluminum copper formed by warm rolling by V=lg(K+L)×h, wherein h represents a preset proportional coefficient;
S2. performing processing based on the representative resistance value V and the representative stress bearing value of the pole aluminum copper formed by warm rolling to obtain a standard determination value of the pole aluminum copper formed by warm rolling.

10. The preparation method for copper-aluminum composite pole plate according to claim 9, characterized in that in S2, obtaining the standard determination value Q of the pole aluminum copper of the forming temperature by formula:

$$Q = \frac{V}{P} \times \theta,$$

wherein P represents the representative stress bearing value of the pole aluminum copper formed by warm rolling, and θ represents the preset proportional coefficient;
specifically, comparing the standard determination value Q of the pole aluminum copper formed by warm rolling with the preset standard determination threshold of the pole aluminum copper formed by warm rolling, and the comparison process is as follows:
if the standard determination value Q of the pole aluminum copper formed by warm rolling is greater than or equal to the preset standard determination threshold of the pole aluminum copper formed by warm rolling, then the pole aluminum copper formed by warm rolling meets the standard;
if the standard determination value Q of the pole aluminum copper formed by warm rolling is less than the preset standard determination threshold of the pole aluminum copper formed by warm rolling, then the pole aluminum copper formed by warm rolling does not meet the standard.

* * * * *